United States Patent [19]

Carroll

[11] Patent Number: 5,544,854
[45] Date of Patent: Aug. 13, 1996

[54] REMOTE CONTROL OF CUT-OUT COCK

[75] Inventor: John B. Carroll, Irwin, Pa.

[73] Assignee: Westinghouse Air Brake Company, Wilmerding, Pa.

[21] Appl. No.: 412,501

[22] Filed: Mar. 28, 1995

[51] Int. Cl.$^6$ ............................. F16K 35/00; B60T 17/04
[52] U.S. Cl. .................. 251/99; 251/95; 303/86
[58] Field of Search .................. 251/95, 98, 99; 137/354; 303/86

[56] References Cited

U.S. PATENT DOCUMENTS

| | | | |
|---|---|---|---|
| 1,379,927 | 5/1921 | Kneass | 251/95 |
| 1,612,433 | 12/1926 | Heil et al. | 251/95 |
| 4,069,836 | 1/1978 | Sowinski | 251/99 |
| 4,099,702 | 7/1978 | Temple | 251/98 |

Primary Examiner—James Larson
Attorney, Agent, or Firm—Gary J. Falce

[57] ABSTRACT

A remote handle operating mechanism for a cut-out cock located on the back side of a pipe bracket on which the service and emergency portions of a railroad brake control valve device are mounted at the front side thereof. A push-pull rod extends from the cut-out cock actuating lever via an opening in a detent bracket to the front of the pipe bracket to facilitate operation of the cut-out cock. A locking rod affixed to the push-pull rod co-acts with the detent bracket to latch the push-pull rod in either one of two positions corresponding to the open and closed positions of the cut-out cock to prevent inadvertent operation of the cut-out cock.

16 Claims, 2 Drawing Sheets

REMOTE CONTROL OF CUT-OUT COCK

BACKGROUND OF THE INVENTION

The present invention relates to handle operating mechanisms for valves and the like and particularly for such valves and the like as are mounted in remote or other inaccessible locations.

In the air brake system for railroad cars, a pneumatic control valve device is operative in response to changes in the pressure of compressed air carried in a train line brake pipe for applying and releasing the car brakes. Associated with the control valve device is a two-position brake pipe cut-out cock that is typically mounted on the pipe bracket of the control valve device to which the brake pipe pressure is connected via a branch pipe. The cut-out cock is normally open, but can be closed when it is desired to cut out an individual car from the train brake system, due to a brake malfunction for example.

On new style pipe brackets, the control valve service and emergency portions are positioned side-by-side on a front mounting face of the pipe bracket and the respective pipe connections, as well as the brake pipe cut-out cock are located on a rear mounting face. With the service and emergency portions extending forwardly from the front mounting face, it becomes difficult to reach the brake pipe cut-out cock handle when it is desired to cut out a car control valve device. While the downwardly disposed cut-out cock handle can be reached by way of the space between the pipe bracket and the car body on which the pipe bracket is mounted, this clearance space is very small, making access to the cut-out cock handle difficult.

Moreover, accessing the cut-out cock handle by reaching through this clearance space presents a dangerous situation in that a serious injury could occur if a trainman slips on the ballast or the train jerks when his arm and/or hand is trapped between the control valve device and car body.

SUMMARY OF THE INVENTION

It is therefore the general object of the present invention to provide a brake pipe cut-out cock remote handle mechanism that is safe and convenient to operate.

It is a further object of the invention to provide a locking arrangement for the handle mechanism to safeguard the handle mechanism against inadvertent operation.

Briefly, in carrying out these objectives, there is provided for a railroad car having a pipe bracket mounted in spaced-apart relationship with the car body by at least one mounting pedestal, a handle mechanism for operating a valve device or the like that is located on the back side of the pipe bracket. The handle mechanism includes an arm connected to a valve member of the valve device or the like and an extension rod having one end connected to the arm and another end terminating at the front side of the pipe bracket to facilitate operation of the valve device or the like. A bracket member is affixed to the mounting pedestal and is provided with an opening through which the extension arm passes in the space between the pipe bracket and car body. A detent arrangement including the bracket member latches the extension rod in either a first position in which the cut-out cock is open or a second position in which the cut-out cock is closed.

BRIEF DESCRIPTION OF THE DRAWINGS

These and other objects and advantages of the present invention will become apparent from the following more detailed explanation when taken in conjunction with the accompanying drawings in which.

DESCRIPTION AND OPERATION

Figure 1:
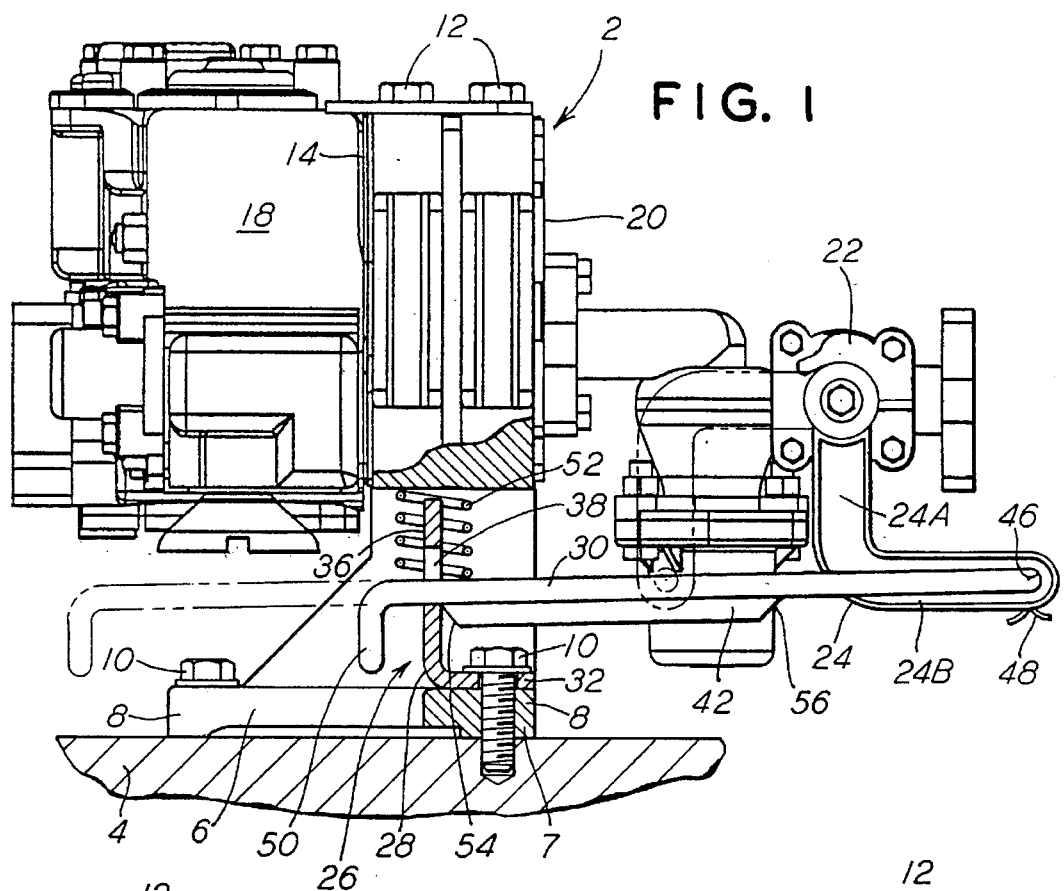
FIG. 1 is an assembly view of the remote handle operating mechanism of the present invention, as viewed from the side of a pipe bracket to which is mounted on a front face thereof service and emergency valve portions comprising a railroad control valve device and on a back face thereof a cut-out cock operated by the handle mechanism of the present invention from a position at the front of the control valve.
Figure 2:
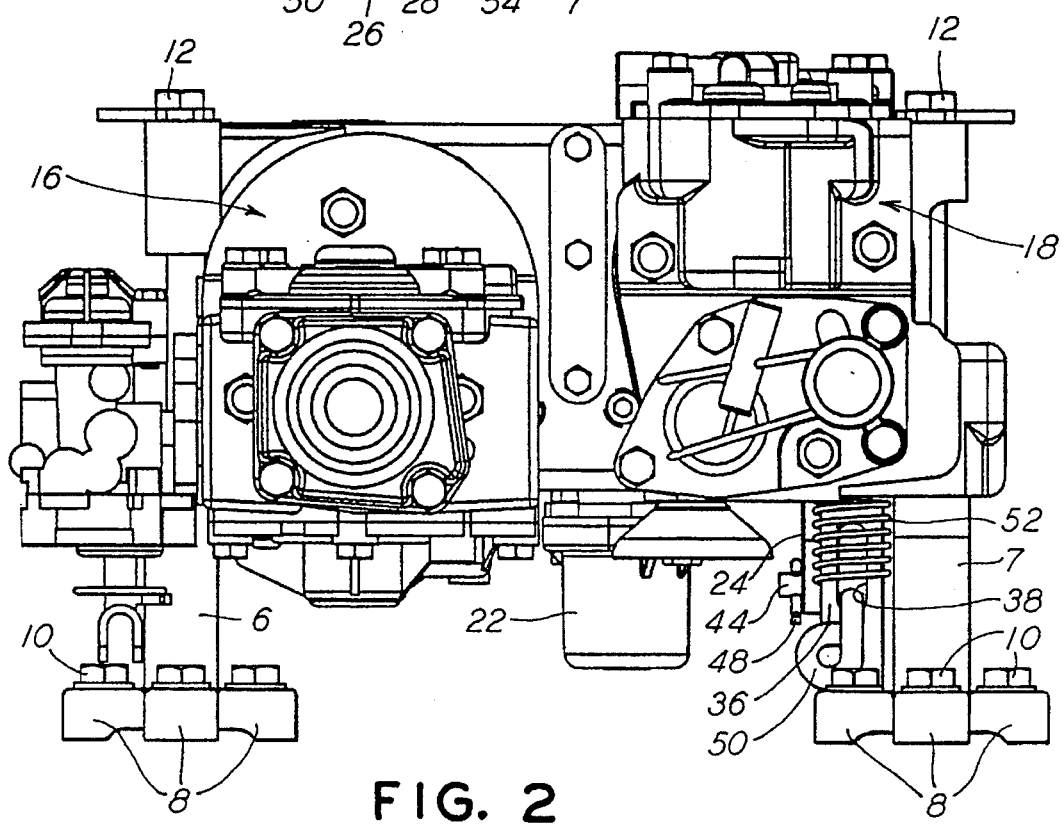
FIG. 2 is an assembly view of the remote handle operating mechanism as viewed from the front face of the pipe bracket on which the control valve service and emergency portions are mounted.

Referring now to FIGS. 1 and 2 of the drawings, there is shown a new style pipe bracket (2) mounted to a railroad car body (4) via a pair of identical mounting pedestals (6) and (7), one at each end of the pipe bracket, as viewed in FIG. 2. Each pedestal (6) and (7) is formed with three mounting lugs (8) having through holes via which bolts (10) are passed to secure the respective pedestals to the car body (4). Pipe bracket (2) rests on the top of pedestals (6) and (7), and is secured in place by elongated bolts (12).

A front face (14) of pipe bracket (2) receives the railroad car control valve service and emergency portions (16), (18) in side-by-side relationship, the front face (14) being oriented such that the service and emergency portions are easily accessible for removal and replacement by a trainman. The back side (20) of pipe bracket (2) is arranged to receive the typical piping (not shown) required to bring air to and to direct air from the respective control valve service and emergency portions. A cut-out cock (22) is also mounted on the back side (20) of pipe bracket (2) and is in turn, connected to the branch pipe (not shown) of the car brake pipe (also not shown). The cut-out cock (22) has an open position in which air is connected from the brake pipe to the control valve device and a closed position in which air in the brake pipe is cut off from the control valve device. A ball valve (not shown) is rotatable through an angle of approximately 90° to establish this open and closed position of the cut-out cock, such angle of rotation being controlled by a lever (24) to which the ball valve is connected. In the open position, lever (24) hangs vertically from its connection with the cut-out cock and in the closed position, lever (24) is disposed horizontally, as shown in phantom lines. A bend of 90° is formed at the midpoint of lever (24) to form arms (24A) and (24B), for a reason hereinafter explained.

A handle operating mechanism (26) is provided to accommodate operation of cut-out cock lever (24) from the front of the control valve device irrespective of its remote location at the rear of the pipe bracket. Handle operating mechanism (26) includes a detent bracket (28) and an extension member (30).

Figure 4:
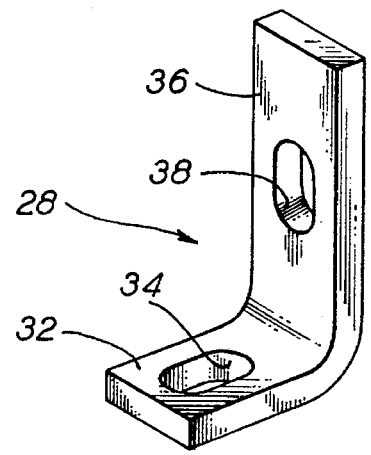
FIG. 4 is an isometric view of a detent bracket member with which the extension member of FIG. 2 is associated to latch the cut-out cock of FIG. 1 in either of its open or closed positions.
Figure 5:
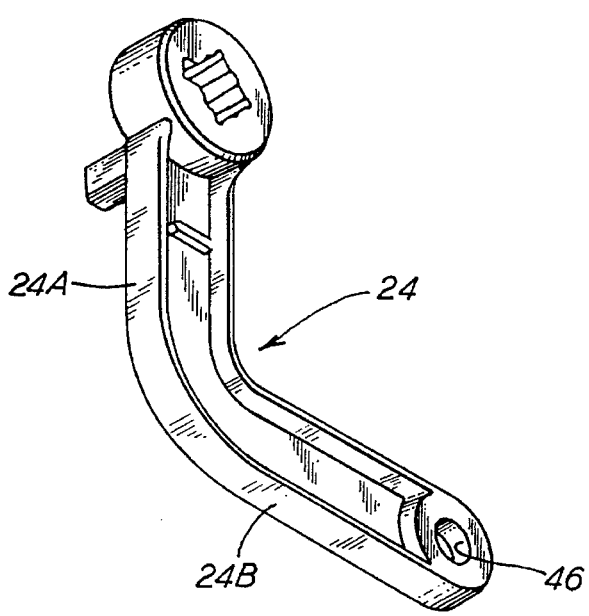
FIG. 5 is an isometric view of a preferred lever via which the extension member of FIG. 2 is connected to the cut-out cock of FIG. 1.

Detent bracket (28) is a generally L-shaped plate, as shown in FIG. 4, having a base (32) in which an elongated hole (34) is provided to receive bolt (10) for affixing detent bracket (28) to the one mounting lug (8) of mounting pedestal (7). Elongated hole (34) accommodates forward/rearward adjustment of mounting bracket (28) for a purpose hereinafter explained. Integral with base (32) and generally perpendicular thereto is a leg (36) that extends from base (32) to a location approximate the underside of pipe bracket (2). Leg (36) is also formed with an elongated hole (38) through which extension member (30) passes, hole (38) being elongated in a vertical direction as viewed in the drawings.

Figure 3:
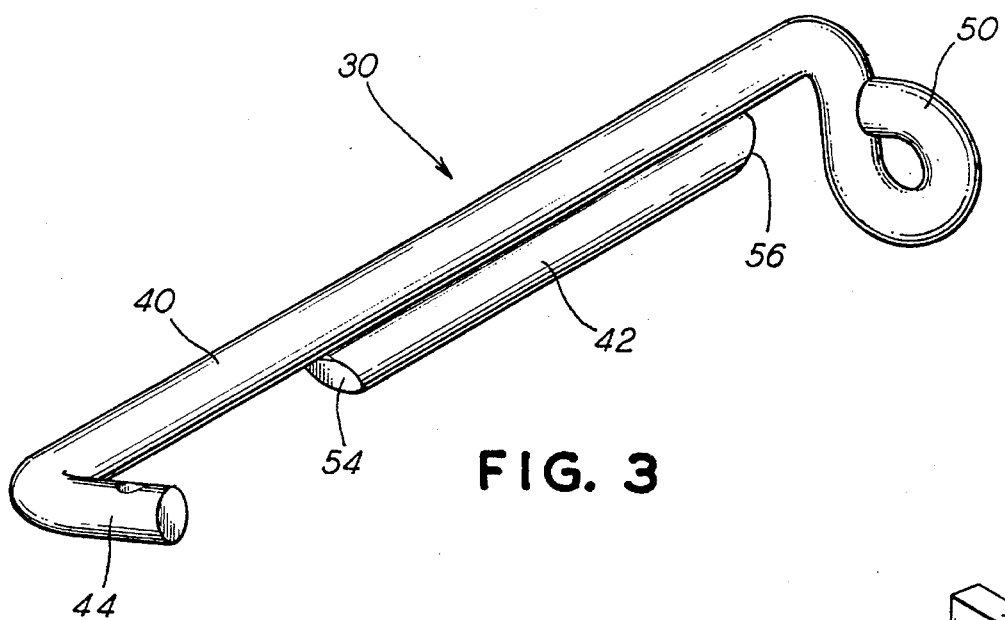
FIG. 3 is an isometric view of an extension member employed in the remote handle operating mechanism of the present invention.

Extension member (30) shown in FIG. 3 comprises a push-pull rod (40) and a locking rod (42) that is welded to the underside of push-pull rod (40) at a location intermediate the ends thereof. One end (44) of push-pull rod (40) is formed with a 90° bend that projects through a hole (46) in cut-out cock lever arm (24B) as shown in FIG. 2 and is fitted with a cotter key (48) to retain the pushpull rod end (44) in pivotal relationship with lever 24. The other end (50) of push-pull rod 40 is directed by way of hole (38) in detent bracket (28) to an area adjoining the front face (14) of pipe bracket (2), being configured to provide a suitable handle grip with which a trainman can actuate the push-pull rod to in turn operate cut-out cock (22).

A helical spring (52) is disposed on detent bracket (28) so as to encircle leg (36) with one end of the spring bearing against the upper side of push-pull rod (40) and the other end bearing against the underside of pipe bracket (2).

The elongated hole (34) in base (32) of detent bracket member (28) allows the detent bracket to be adjusted forward and backward, such adjustment being made to assure that the opposite ends (54), (56) of locking rod (42) engage the respective opposite faces of the detent bracket member (28) with approximately the same amount of clearance relative to the open and closed stop positions of the cut-out cock (22).

In the normally open position of cut-out cock (22), as shown in FIG. 1, the lefthand end (54) of locking rod (42) is contiguous with the righthand face of detent bracket (28), such that locking rod (42) abuts detent bracket (28) when the handle of push-pull rod (40) is pulled. This abutment of locking rod (42) with detent bracket (28) is assured by the action of spring (52), which maintains a constant downward bias on extension member (30). Such an arrangement requires a positive action at the handle end of push-pull rod (40) to overcome the force of spring (52) in order to unlatch extension member (30) thereby preventing inadvertent operation of the cut-out cock out of its normally open position.

When it is desired to close cut-out cock (22), the handle end of push-pull rod (40) is lifted sufficiently to allow locking rod (42) to enter hole (38), which unlatches extension member (30) and allows the handle end of pushpull rod (40) to be pulled in a leftward direction. When lever (24) has rotated the valve member of cut-out cock (22) sufficiently to establish its closed condition (shown by phantom lines) in response to such leftward movement of extension member (30), the righthand end (56) of locking rod (42) passes through hole (38) and latches against the lefthand face of detent bracket (28) under the influence of spring (52). In this closed position, as in the open position, a positive action of the handle end of extension member (30) is required to overcome the force of spring (52) and unlatch the extension member, thereby preventing inadvertent operation of the cut-out cock.

Several features of the above-described handle operating mechanism (26) make this unlatching and subsequent longitudinal movement of the extension member between open and closed positions smooth, reliable and positive in operation. Firstly, the respective righthand and lefthand ends (54), (56) of locking rod (42) are tapered to cause a push or pull on the handle end of push-pull rod (40) to produce an upward acting force component to aid in providing the lifting force required to overcome the downward force exerted by spring (52) when it is desired to change the cut-out cock position. This eliminates the need to first lift and then pull or push the extension rod in two separate and distinct operations, as would be the case if the locking rod ends were blunt as opposed to being tapered.

Conversely, the tapered ends (54), (56) of locking rod (42), in conjunction with detent bracket (28), produce a longitudinal force component under the influence of spring (52) and vibration when the push-pull rod (40) is not properly set in either full open or full closed position of the cut-out cock (22). This results in the push-pull rod being automatically shifted longitudinally to a positive locking position of the locking rod (42) corresponding to full open or full closed position of the cut-out cock.

In addition, the bailing action of extension member (30) is minimized so that extension member (30) moves longitudinally in a generally straight path between the open and closed positions of cut-out cock (22). This is accomplished by reason of the fact that as the end of lever arm (24A) connected to cut-out cock (22) rotates 90° between vertical and horizontal corresponding to open and closed positions, arm (24B) of lever (24) that is connected to push-pull rod (30) swings equal distances on either side of vertical and thus its vertical displacement is minimized. While this same benefit could be achieved with a straight lever set 45° from vertical in open position, this offset orientation of lever (24) would differ from the conventional vertically disposed orientation of lever (24) that is well recognized by train personnel as representing open position.

I claim:

1. A remote handle actuating mechanism for a two-position valve device where said valve device is located on the back side of a pipe bracket that is mounted on a railroad car body by at least one mounting pedestal that supports the pipe bracket with the underside thereof in spaced-apart relationship with the car body comprising:

a) a lever having one end connected to a movable member of said valve device;

b) an extension member having one end connected to the other end of said lever and a handle end terminating at the front side of said pipe bracket;

c) a bracket member affixed to said at least one mounting pedestal and having an opening therethrough via which said extension member passes in the space between the underside of said pipe bracket and said car body; and d) detent means including said bracket member for providing latching engagement of said extension member therewith in a first position of said extension member in which said valve device is in a first operative condition and in a second position of said extension member in which said valve device is in a second operative condition.

2. A remote handle actuating mechanism as recited in claim 1, wherein said detent means further includes spring means for urging said extension member into said latching engagement thereof with said bracket member.

3. A remote handle actuating mechanism as recited in claim 2, wherein said spring means is a helical spring that encircles said bracket member between the underside of said pipe bracket and said extension member.

4. A remote handle actuating mechanism as recited in claim 1, wherein said detent means further includes:
   a) said extension member having first and second stops intermediate said one end and said handle end, said first stop abutting said bracket member in said first position of said extension member and said second stop abutting said bracket member in said second position of said extension member; and
   b) said opening in said bracket member being elongated, the maximum dimension of said elongated opening being greater than the corresponding dimension of said extension member, whereby said extension member is displaceable in the direction of elongation of said opening to disengage said first and second stops from said abutting engagement with said bracket member and thereby release said latching engagement of said extension member; and
   c) spring means for urging said extension member in the direction of said latching engagement thereof with said bracket member.

5. A remote handle actuating mechanism as recited in claim 4, wherein said extension member comprises:
   a) a push-pull rod, the opposite ends of which comprise said one end and said handle end of said extension member; and
   b) a locking rod affixed to said push-pull rod intermediate said opposite ends thereof and in generally parallel relationship therewith, the length of said locking rod being less than the length of said push-pull rod such that one end of said locking rod provides said first stop and the other end of said locking rod provides said second stop.

6. A remote handle actuating mechanism as recited in claim 5, wherein said one end of said locking rod abuts said bracket member on one side thereof to provide said latching engagement of said extension member in said first position thereof and said other end of said locking rod abuts said bracket member on the other side thereof to provide said latching engagement of said extension member in said second position thereof.

7. A remote handle actuating mechanism as recited in claim 6, wherein said bracket member is a generally L-shaped plate member comprising a base affixed to said at least one mounting pedestal and an integral leg having said opening, opposite faces of said leg comprising said one and said other sides of said bracket member, said one and said other ends of said locking rod abutting said opposite faces of said leg adjacent said opening.

8. A remote handle actuating mechanism as recited in claim 7, wherein said spring means is a compression spring disposed between said underside of said pipe bracket and said push-pull rod.

9. A remote actuating handle mechanism as recited in claim 8, wherein said spring encircles said leg of said member bracket.

10. A remote handle actuating mechanism as recited in claim 7, wherein said one and said other ends of said locking rod are tapered.

11. A remote handle actuating mechanism as recited in claim 5, wherein said locking rod is affixed lengthwise of said push-pull rod along the underside thereof such that the maximum combined dimension of said push-pull rod and said locking rod in a direction perpendicular to the lengthwise direction thereof is less than the dimension of said opening in the direction of elongation thereof.

12. A remote handle actuating mechanism as recited in claim 11, wherein at least one of said push-pull rod and said locking rod is cylindrical in shape.

13. A remote handle actuating mechanism as recited in claim 11, wherein each said push-pull rod and said locking rod is cylindrical in shape.

14. A remote handle actuating mechanism as recited in claim 5 wherein said push-pull rod is formed with a bend approximate one of said opposite ends corresponding to said handle end of said extension member.

15. A remote handle actuating mechanism as recited in claim 5, wherein said lever is formed with a bend to provide a first arm between said bend and said one end of said lever and a second arm between said bend and said other end of said lever, said first arm in said first operating condition of said valve device being disposed generally perpendicular to the interface between said at least one mounting pedestal and said car body.

16. A remote handle actuating mechanism as recited in claim 15, wherein said second arm is pivotally connected at said other end of said lever to one of said opposite ends of said push-pull rod corresponding to said one end of said extension member.

* * * * *